(12) United States Patent
Hsu et al.

(10) Patent No.: US 12,289,040 B2
(45) Date of Patent: Apr. 29, 2025

(54) DRIVING CIRCUIT AND PROJECTION DEVICE

(71) Applicant: Coretronic Corporation, Hsin-Chu (TW)

(72) Inventors: Chia-Wen Hsu, Hsin-Chu (TW); Chen-Wang Chen, Hsin-Chu (TW); Tung-Min Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 434 days.

(21) Appl. No.: 17/945,051

(22) Filed: Sep. 14, 2022

(65) Prior Publication Data
US 2023/0083055 A1  Mar. 16, 2023

(30) Foreign Application Priority Data
Sep. 16, 2021  (CN) .......... 202111085372.5

(51) Int. Cl.
H02M 1/00   (2007.01)
H02M 3/157   (2006.01)
H04N 9/31   (2006.01)

(52) U.S. Cl.
CPC ......... *H02M 1/0009* (2021.05); *H02M 3/157* (2013.01); *H04N 9/3135* (2013.01)

(58) Field of Classification Search
None
See application file for complete search history.

(56) References Cited

U.S. PATENT DOCUMENTS 11,848,610 B2 * 12/2023 Chen .............. H02M 1/14
2019/0356228 A1 * 11/2019 Dubus ............ H02M 3/1582
2020/0195153 A1 * 6/2020 Chen ............... H02M 3/33571
2021/0399646 A1 * 12/2021 Hwang .............. H02M 1/34
2022/0209669 A1 * 6/2022 Sharifi ............. H02M 3/1563
2023/0231469 A1 * 7/2023 Lee ................. H02M 3/158
                                                     323/271
2023/0336069 A1 * 10/2023 Taniguchi ......... H02M 3/156
2023/0402924 A1 * 12/2023 Ogasawara ........ H02J 7/00
2024/0063708 A1 * 2/2024 Arisawa ............ H02M 1/007
2024/0171080 A1 * 5/2024 Hirokawa ......... H02M 1/0009
2024/0291275 A1 * 8/2024 Mukunoki ........ H02J 3/48

FOREIGN PATENT DOCUMENTS

TW   201308842   2/2013
TW   202107936   2/2021

* cited by examiner

*Primary Examiner* — Wilson Lee
(74) *Attorney, Agent, or Firm* — JCIPRNET

(57) ABSTRACT

A driving circuit for driving a light source and a projection device are provided. The driving circuit includes a power converter, a detection circuit, and a control circuit. The power converter provides a driving power to the light source. The detection circuit provides a feedback signal according to a current value of the light source. The control circuit receives an operation command and the feedback signal. The control circuit determines whether the driving circuit enters a light-load state according to at least one of the operation command and the feedback signal. When the driving circuit is determined to enter the light-load state, the control circuit controls the power converter to decrease a current value of the driving power and controls the power converter to increase a switching frequency of the driving power. The driving circuit and the projection device may prevent the light source from flickering under the light-load state.

8 Claims, 4 Drawing Sheets

DRIVING CIRCUIT AND PROJECTION DEVICE

CROSS-REFERENCE TO RELATED APPLICATION

This application claims the priority benefit of China application serial no. 202111085372.5, filed on Sep. 16, 2021. The entirety of the above-mentioned patent application is hereby incorporated by reference herein and made a part of this specification.

BACKGROUND

Technical Field

The invention relates to a driving circuit and a projection device, and particularly relates to a driving circuit and a projection device adapted to prevent a light source from flickering under a light-load state.

Description of Related Art

When a projection device projects a high-contrast image, the projection device enters a light-load state, and a light source may be supplied with a lower current. However, the low current output may present a discontinuous waveform, which causes flickering of a projection image of the projection device. A main reason is that a driving current provided by a power converter is a non-constant sawtooth wave. When the projection device enters the light-load state, the driving current may be translated downward. A current value of the driving current may generate a positive current value and a negative current value sequentially. The positive current may turn on the light source to output light. The negative current may turn off the light source to stop outputting light. Therefore, the projection image may have a flickering phenomenon. How to prevent the light source of the projection device from flickering under the light-load state is one of the research directions of those skilled in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a driving circuit and a projection device, which are adapted to prevent a light source from flickering under a light-load state.

In order to achieve one or a portion of or all of the objects or other objects, an embodiment of the invention provides a driving circuit for driving a light source. The driving circuit includes a power converter, a detection circuit, and a control circuit. The power converter is coupled to the light source. The power converter provides a driving power to the light source. The detection circuit provides a feedback signal according to a current value of the light source. The control circuit is coupled to the detection circuit and the power converter. The control circuit receives an operation command and the feedback signal. The control circuit determines whether the driving circuit enters a light-load state according to at least one of the operation command and the feedback signal. When the driving circuit is determined to enter the light-load state, the control circuit controls the power converter to decrease a current value of the driving power in response to the operation command in the light-load state, and controls the power converter to increase a switching frequency of the driving power.

In order to achieve one or a portion of or all of the objects or other objects, an embodiment of the invention provides a projection device including a light source, an image projection module, and a driving circuit. The light source is driven to provide a projection light beam. The image projection module uses the projection light beam to project a projection image. The driving circuit drives the light source. The driving circuit includes a power converter, a detection circuit, and a control circuit. The power converter is coupled to the light source. The power converter provides a driving power to the light source. The detection circuit provides a feedback signal according to a current value of the light source. The control circuit is coupled to the detection circuit and the power converter. The control circuit receives an operation command and the feedback signal. The control circuit determines whether the driving circuit enters a light-load state according to at least one of the operation command and the feedback signal. When the driving circuit is determined to enter the light-load state, the control circuit controls the power converter to decrease a current value of the driving power in response to the operation command in the light-load state, and controls the power converter to increase a switching frequency of the driving power.

Based on the above descriptions, when the driving circuit is determined to enter the light-load state, the control circuit controls the power converter to decrease the current value of the driving power in response to the operation command in the light-load state, and controls the power converter to increase the switching frequency of the driving power. Therefore, in the light-load state, the driving power does not generate a negative current value. In this way, the invention is adapted to prevent the light source from flickering under the light-load state.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
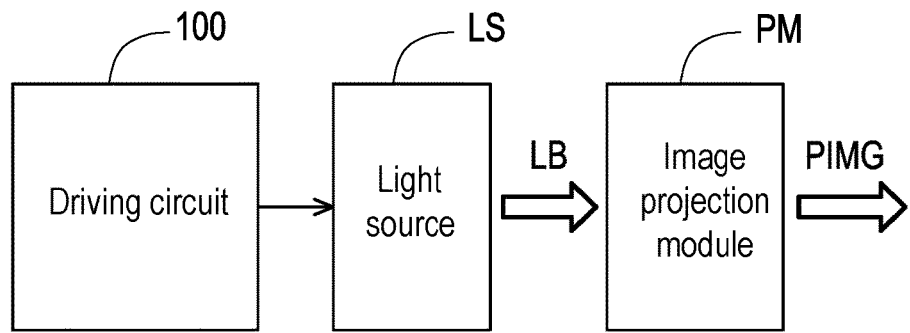
FIG. 1 is a schematic diagram of a projection device according to an embodiment of the invention.
Figure 2:
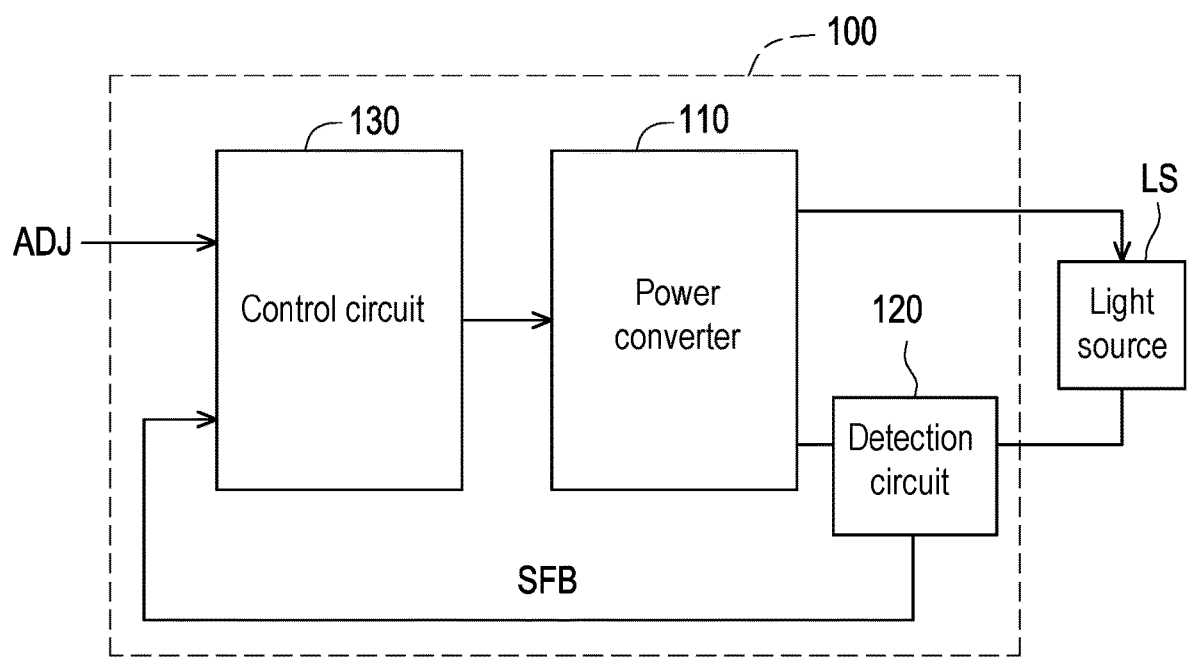
FIG. 2 is a schematic diagram of a driving circuit and a light source according to an embodiment of the invention.

Referring to FIG. 1 and FIG. 2, FIG. 1 is a schematic diagram of a projection device according to an embodiment of the invention, and FIG. 2 is a schematic diagram of a driving circuit according to an embodiment of the invention. In the embodiment, the projection device 10 includes a light source LS, an image projection module PM, and a driving circuit 100. The light source LS is driven to provide a projection light beam LB. The light source LS may include one or a plurality of light-emitting elements, which include at least one lamp or at least one solid-state illumination source. The solid-state illumination source is, for example, a light-emitting diode or a laser diode. The image projection module PM uses the projection light beam to project a projection image PIMG. The image projection module PM may be a collection of projection elements including an optical engine module, a light valve, a projection lens, etc.

The driving circuit 100 drives the light source LS. The driving circuit 100 may learn whether to enter a light-load state according to at least one of a current of the light source LS and an operation command ADJ. In the light-load state, the driving circuit 100 reduces a current value of a driving power PDR and increases a switching frequency of the driving power PDR.

Further, referring to FIG. 2, in the embodiment, the driving circuit 100 includes a power converter 110, a detection circuit 120 and a control circuit 130. The power converter 110 is coupled to the light source LS. The power converter 110 provides the driving power PDR to the light source LS. The detection circuit 120 is coupled to the light source LS. The detection circuit 120 provides a feedback signal SFB according to a current value of the driving power PDR. In other words, the detection circuit 120 provides the feedback signal SFB according to the current value of the current flowing through the light source LS.

In the embodiment, the control circuit 130 is coupled to the detection circuit 120 and the power converter 110. The control circuit 130 receives the operation command ADJ and the feedback signal SFB. The operation command ADJ is a command that instructs the driving circuit 100 to enter the light-load state. In the embodiment, the control circuit 130 determines whether the driving circuit 100 enters the light-load state according to at least one of the operation command ADJ and the feedback signal SFB. When the driving circuit 100 is determined to enter the light-load state, the control circuit 130 controls the power converter 110 to decrease the current value of the driving power PDR in response to the operation command ADJ in the light-load state. Moreover, the control circuit 130 further controls the power converter 110 to increase a switching frequency of the driving power PDR in the light-load state.

Figure 3:
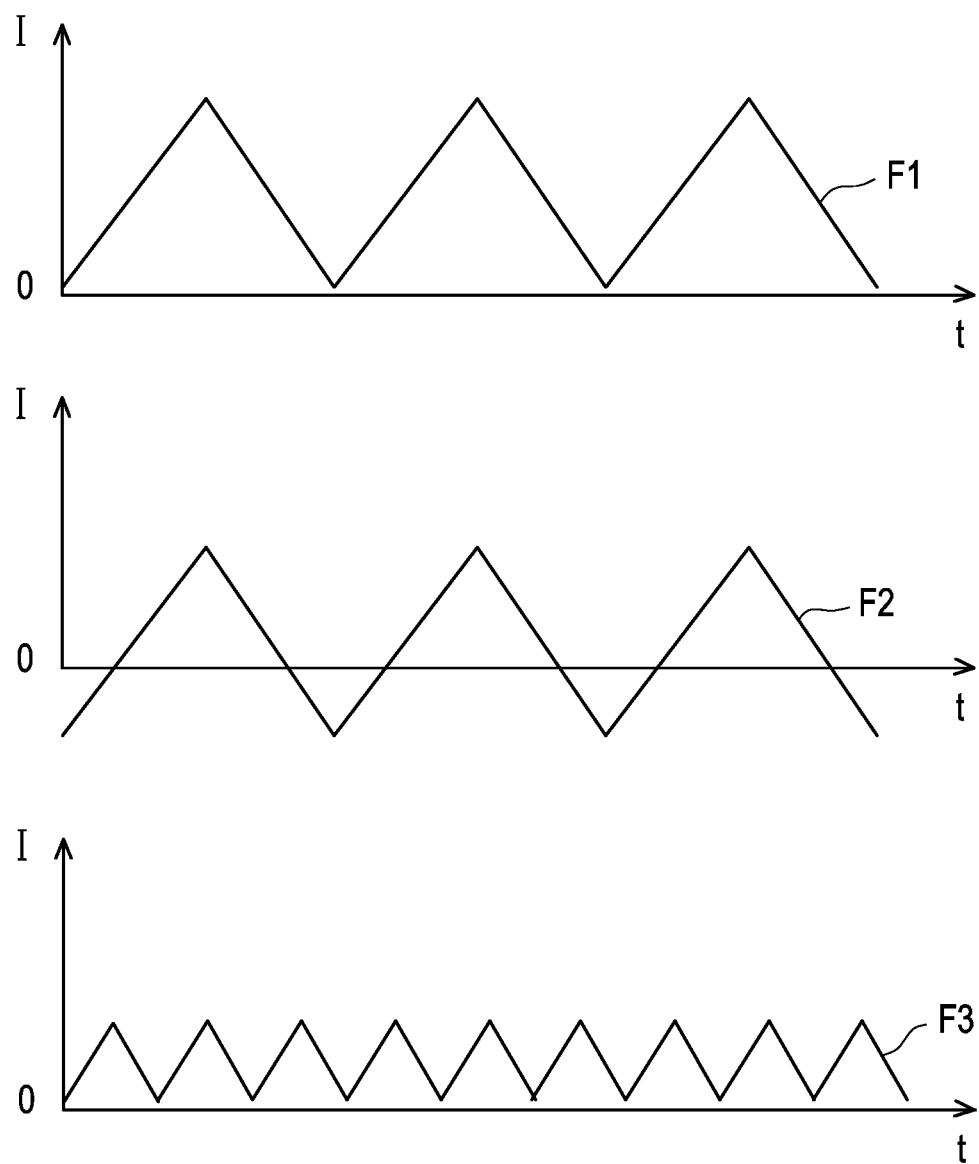
FIG. 3 is a waveform diagram of a current value of a driving power under different load conditions according to an embodiment of the invention.

Referring to FIG. 2 and FIG. 3 at the same time, FIG. 3 is a waveform diagram of a current value of a driving power under different load conditions according to an embodiment of the invention. A waveform F1 represents a current value waveform of the driving power PDR under a non-light-load state. A waveform F2 represents a current value waveform of a conventional driving power under a light-load state. In the light-load state, the waveform F1 may be translated downward to generate the waveform F2. At this time, the current value may generate a positive current value and a negative current value sequentially. The positive current may turn on the light source LS to output light. The negative current may off the light source LS to stop outputting light. Therefore, the projection image may have a flicker phenomenon. A waveform F3 represents a current value waveform of the driving power PDR of the invention under the light-load state. Since a switching frequency of the waveform F3 is increased, the current value of the waveform F3 will not be lower than 0 ampere. Therefore, the projection image may not have the flicking phenomenon.

It should be noted that when the driving circuit 100 is determined to enter the light-load state, the control circuit 130 reduces the current value of the driving power PDR in the light-load state, and increases the switching frequency of the driving power PDR. Therefore, in the light-load state, the driving power PDR will not generate the negative current value. In this way, the driving circuit 100 may prevent the light source LS from flickering under the light-load state.

Figure 4:
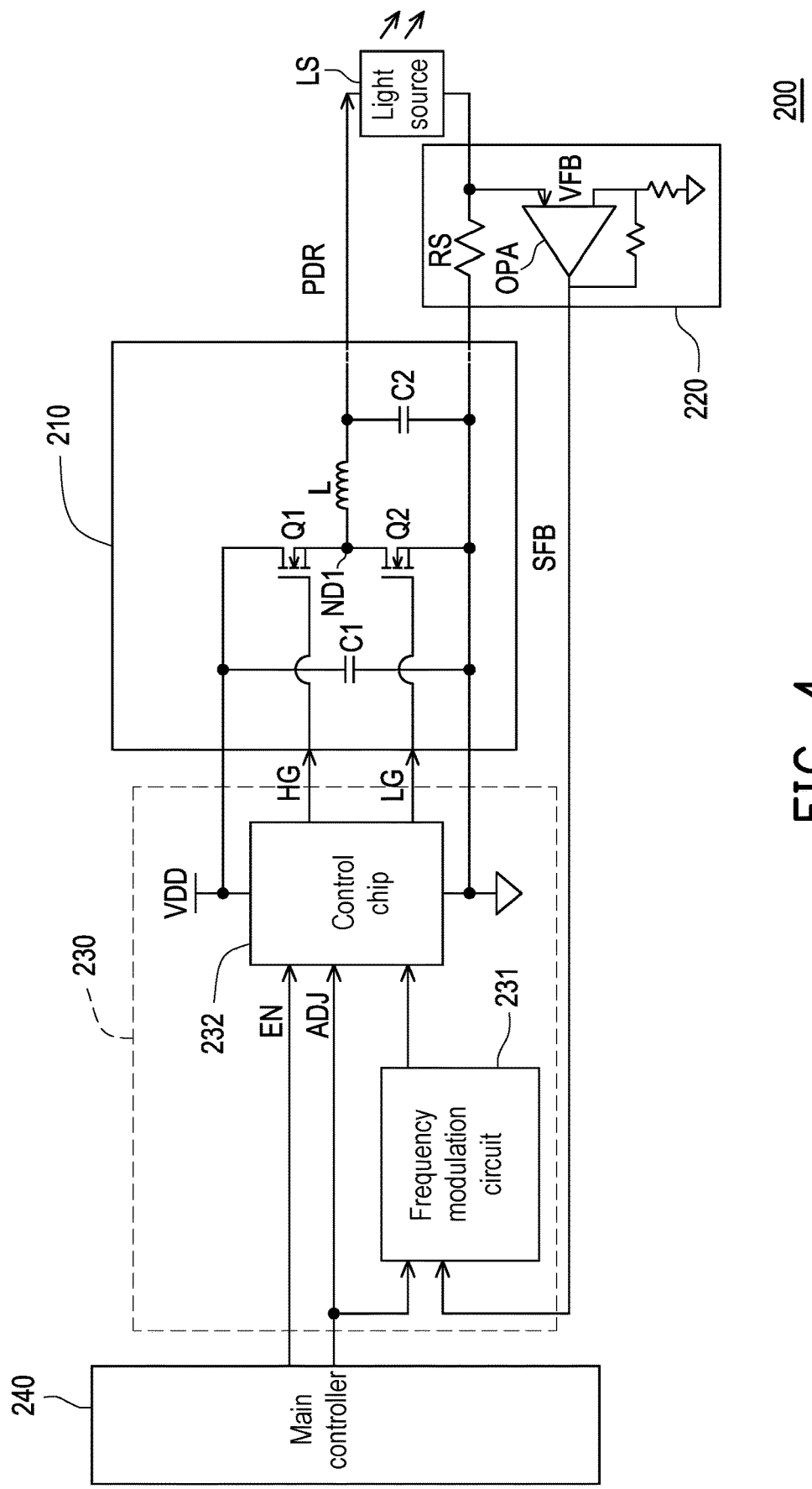
FIG. 4 is a schematic diagram of a driving circuit and a light source according to an embodiment of the invention.

Referring to FIG. 4, FIG. 4 is a schematic diagram of a driving circuit and a light source according to an embodiment of the invention. In the embodiment, a driving circuit 200 includes a power converter 210, a detection circuit 220, a control circuit 230, and a main controller 240. In the embodiment, the power converter 210 includes a boost converter. The boost converter includes an input capacitor C1, transistors Q1, Q2, a boost inductor L, and an output capacitor C2. The input capacitor C1 is coupled between a reference high voltage VDD and a reference low voltage (for example, the ground). A first terminal of the transistor Q1 is coupled to the reference high voltage VDD. A second terminal of the transistor Q1 is coupled to a connection node ND1. A first terminal of the transistor Q2 is coupled to the connection node ND1. A second terminal of the transistor Q2 is coupled to the reference low voltage. A control terminal of the transistor Q1 and a control terminal of the transistor Q2 are respectively coupled to the control circuit 230. A first terminal of the boost inductor L is coupled to the connection node ND1. A second terminal of the boost inductor L is used as an output terminal of the power converter 210. The output capacitor C2 is coupled between the second terminal of the boost inductor L and the reference low voltage.

In the embodiment, the detection circuit 220 includes a sensing resistor RS and an operational amplifier OPA. The sensing resistor RS is coupled between the light source LS and the reference low voltage. The sensing resistor RS converts the current value of the current flowing through the light source LS (i.e., the current value of the driving power PDR) into a feedback voltage value VFB. The operational amplifier OPA is coupled to the sensing resistor RS. The operational amplifier OPA gains the feedback voltage value VFB to generate the feedback signal SFB.

The main controller 240 is coupled to the control circuit 230. The main controller 240 generates the operation command ADJ according to a usage situation of the projection device 10 to make the driving circuit 200 entering the light-load state.

In the embodiment, the control circuit 230 includes a frequency modulation circuit 231 and a control chip 232. The frequency modulation circuit 231 is coupled to the detection circuit 220 and the main controller 240. In the light-load state, the frequency modulation circuit 231 may affect a charging time of the control chip 232. Furthermore, the frequency modulation circuit 231 changes the charging time of the control chip 232 in response to at least one of the operation command ADJ and the feedback signal SFB. The control chip 232 is coupled to the frequency modulation circuit 231 and the power converter 210. The control chip 232 may use a control signal HG to control the transistor Q1, and uses a control signal LG to control the transistor Q2.

In the embodiment, the control chip 232 controls the power converter 210 to increase the switching frequency of the driving power PDR according to the charging time. In the light-load state, the charging time of the control chip 232 may be shortened. Therefore, the switching frequency of the driving power PDR is increased.

For example, when receiving the feedback signal SFB corresponding to a low current value or the operation command ADJ, the driving circuit 200 enters the light-load state. The frequency modulation circuit 231 may reduce an impedance originally set by the frequency modulation circuit 231. The charging time of the control chip 232 may be shortened, so that the switching frequency of the driving power PDR is increased. In addition, when receiving the operation command ADJ, the control chip 232 may control the power converter 210 to decrease the current value of the driving power PDR.

For another example, when the feedback signal SFB corresponding to the low current value is not received and the operation command ADJ is not received, the driving circuit 200 leaves the light-load state and returns to a medium-load state or a heavy-load state. The frequency modulation circuit 231 restores (or resets) the impedance of the frequency modulation circuit 231. The charging time of the control chip 232 is restored, and the switching frequency of the driving power PDR is restored. In addition, the control chip 232 may control the power converter 210 to restore the current value of the driving power PDR.

For another example, when the control circuit 230 receives the feedback signal SFB corresponding to the low current value without receiving the operation command ADJ, it means that the driving circuit 200 does not enter the light-load state, but the current value of the driving power PDR is reduced. Therefore, the switching frequency of the driving power PDR may be increased, but the current value of the driving power PDR at this moment is not decreased.

In the embodiment, the main controller 240 also activates the control chip 232 through an enable signal EN.

Figure 5:
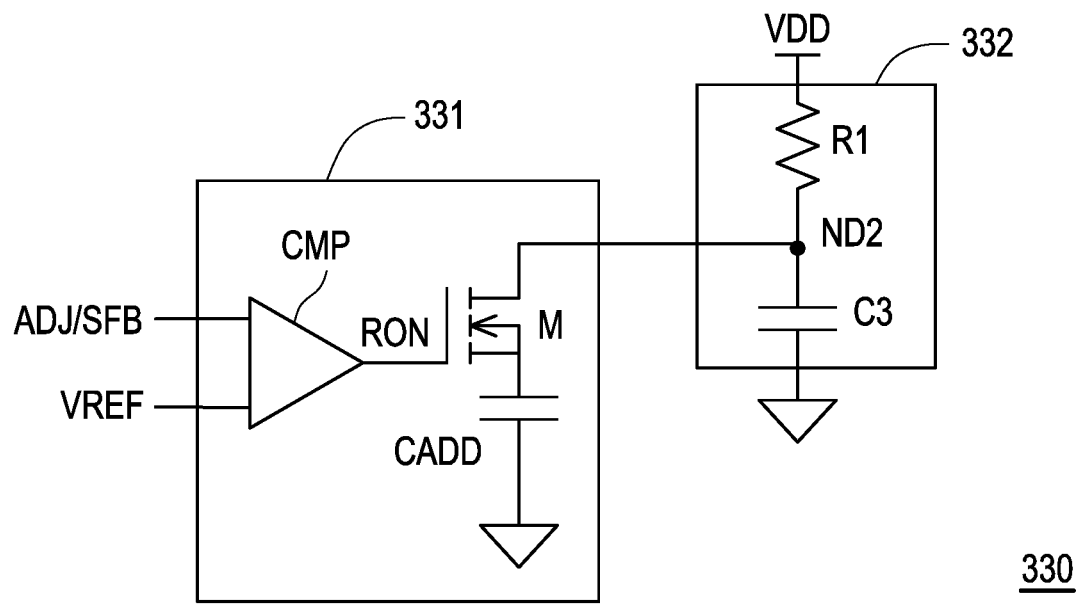
FIG. 5 is a partial schematic diagram of a control circuit according to an embodiment of the invention.

Implementation details of the frequency modulation circuit are further explained below. Referring to FIG. 5, FIG. 5 is a partial schematic diagram of a control circuit according to an embodiment of the invention. In the embodiment, a control circuit 330 includes a frequency modulation circuit 331 and a control chip 332. In the embodiment, the control chip 332 may be implemented by, for example, TPS92641 or other chips with similar functions. The control chip 332 includes a resistor R1 and a capacitor C3. The resistor R1 is coupled between the reference high voltage VDD and a connection node ND2. The capacitor C3 is coupled between the connection node ND2 and the reference low voltage. The frequency modulation circuit 331 includes a comparator CMP, a transistor M, and a capacitor CADD. The comparator CMP compares one of a voltage value of the operation command ADJ and a voltage value of the feedback signal SFB with a reference voltage value VREF to generate a frequency modulation signal RON. A control terminal of the transistor M is coupled to the comparator CMP. A first terminal of the transistor M is coupled to the connection node ND2 of the control chip 332. The transistor M is turned on or turned off according to the frequency modulation signal RON. A first terminal of the capacitor CADD is coupled to a second terminal of the transistor M. A second terminal of the capacitor CADD is coupled to the reference low voltage. The transistor M in the embodiment is implemented by, for example, various types of N-type transistors (the invention is not limited to this embodiment).

For example, a first input terminal of the comparator CMP receives the reference voltage value VREF. When instructed to be in the medium-load state or the heavy-load state, a second input terminal of the comparator CMP may receive a command corresponding to the medium-load state or the heavy-load state, and may not receive the operation command ADJ corresponding to the light-load state. Since a voltage value of the command is higher than a voltage value of the reference voltage value VREF, in the medium-load state or the heavy-load state, the comparator CMP may provide the frequency modulation signal RON with a high voltage level to turn on the transistor M, and the frequency modulation circuit 331 provides the capacitor CADD. In other words, a first impedance network provided by the resistor R1, the capacitor C3, and the capacitor CADD is an impedance network corresponding to the medium-load state or the heavy-load state. Therefore, a charging time of the control chip 332 is determined by a resistance value of the resistor R1 and capacitance values of the capacitors C3 and CADD.

On the other hand, when instructed to be in the light-load state, the second input terminal of the comparator CMP may receive the operation command ADJ. The voltage value of the operation command ADJ is set to a voltage value lower than the reference voltage value VREF. Therefore, in the light-load state, the comparator CMP may provide the frequency modulation signal RON with a low voltage level to turn off the transistor M, and the frequency modulation circuit 331 does not provide the capacitor CADD. Namely, a second impedance network provided by the resistor R1 and the capacitor C3 is an impedance network corresponding to the light-load state. Therefore, the charging time of the control chip 332 is determined by the resistance value of the resistor R1 and the capacitance value of the capacitor C3. It should be noted that, compared to the first impedance network, an equivalent capacitance value of the second impedance network is lower, which results in a fact that the connection node ND2 has a lower charging time. Therefore, the switching frequency of the driving power may be increased.

In some embodiments, the command corresponding to the medium-load state or the heavy-load state is set to a voltage value lower than the reference voltage value VREF. In the medium-load state or the heavy-load state, the comparator CMP is designed to provide the frequency modulation signal RON with the high voltage level. In addition, the voltage value of the operation command ADJ may be set to a voltage value higher than the reference voltage value VREF. Therefore, in the light-load state, the comparator CMP is designed to provide the frequency modulation signal RON with the low voltage level. Comparison implementation of the comparator CMP of the invention may be adjusted according to the voltage level of the actual operation command ADJ, and is not limited to the above example.

For another example, the first input terminal of the comparator CMP receives the reference voltage value VREF. The second input terminal of the comparator CMP receives the feedback signal SFB. When the comparator CMP receives the feedback signal SFB with a high voltage level, it indicates that the current value of the driving power is not decreased. In the case that the operation command ADJ is not provided, the voltage value of the feedback signal SFB with the high voltage level is higher than the reference voltage value VREF. Therefore, in the medium-load state or the heavy-load state, the comparator CMP may provide the frequency modulation signal RON with the high voltage level to turn on the transistor M, and the frequency modulation circuit 331 provides the capacitor CADD. The control circuit 330 may provide the first impedance network in the medium-load state or the heavy-load state. On the other hand, when the comparator CMP receives the feedback signal SFB with the low voltage level, it represents that the current value of the driving power is decreased. The voltage value of the feedback signal SFB with the low voltage level is lower than the reference voltage value VREF. Therefore, the comparator CMP may provide the frequency modulation signal RON with the low voltage level to turn off the transistor M. The frequency modulation circuit 331 does not provide the capacitor CADD. The control circuit 330 may provide the second impedance network. Therefore, the switching frequency of the driving power may be increased.

Figure 6:
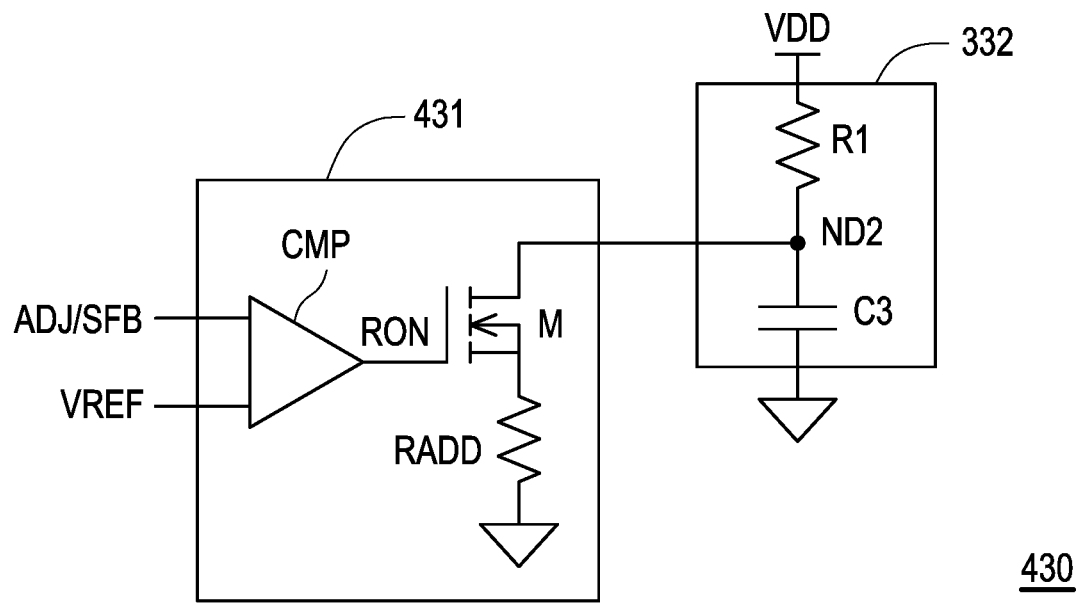
FIG. 6 is a partial schematic diagram of a control circuit according to another embodiment of the invention.

Referring to FIG. 6, FIG. 6 is a partial schematic diagram of a control circuit according to another embodiment of the invention. In the embodiment, a control circuit 430 includes a frequency modulation circuit 431 and the control chip 332. The frequency modulation circuit 431 includes a comparator CMP, a transistor M, and a resistor RADD. The comparator CMP compares one of the voltage value of the operation command ADJ and the voltage value of the feedback signal SFB with the reference voltage value VREF to generate the frequency modulation signal RON. A control terminal of the transistor M is coupled to the comparator CMP. A first terminal of the transistor M is coupled to the connection node ND2 of the control chip 332. The transistor M is turned on or turned off according to the frequency modulation signal RON. A first terminal of the resistor RADD is coupled to a second terminal of the transistor M. A second terminal of the resistor RADD is coupled to the reference low voltage.

For example, the first input terminal of the comparator CMP receives the reference voltage value VREF. When instructed to be in the medium-load state or the heavy-load state, the second input terminal of the comparator CMP may receive the command corresponding to the medium-load state or the heavy-load state without receiving the operation command ADJ corresponding to the light-load state. Therefore, the comparator CMP may provide the frequency modulation signal RON with the high voltage level to turn on the transistor M. The frequency modulation circuit 431 provides the resistor RADD. Therefore, the charging time of the control chip 332 is determined by the resistance values of the resistors R1 and RADD and the capacitance value of the capacitor C3.

On the other hand, when instructed to be in the light-load state, the second input terminal of the comparator CMP may receive the operation command ADJ. Therefore, in the light-load state, the comparator CMP may provide the frequency modulation signal RON with the low voltage level to turn off the transistor M, and the frequency modulation circuit 431 does not provide the resistor RADD. The charging time of the control chip 332 is determined by the resistance value of the resistor R1 and the capacitance value of the capacitor C3. Therefore, the switching frequency of the driving power may be increased.

For another embodiment, the first input terminal of the comparator CMP receives the reference voltage value VREF. The second input terminal of the comparator CMP receives the feedback signal SFB. When the comparator CMP receives the feedback signal SFB with the high voltage level, it represents that the current value of the driving power is not decreased. In the case that the operation command ADJ is not provided, the voltage value of the feedback signal SFB with the high voltage level is higher than the reference voltage value VREF. Therefore, in the medium-load state or the heavy-load state, the comparator CMP may provide the frequency modulation signal RON with the high voltage level to turn on the transistor M. The frequency modulation circuit 431 provides the resistor RADD. On the other hand, when the comparator CMP receives the feedback signal SFB with the low voltage level, it represents that the current value of the driving power is decreased. The voltage value of the feedback signal SFB with the low voltage level is lower than the reference voltage value VREF. Therefore, the comparator CMP may provide the frequency modulation signal RON with the low voltage level to turn off the transistor M. The frequency modulation circuit 431 does not provide the resistor RADD. Therefore, the switching frequency of the driving power may be increased.

In summary, the embodiments of the invention have at least one of following advantages or effects. When the driving circuit is determined to enter the light-load state, the control circuit controls the power converter to decrease the current value of the driving power in response to the operation command in the light-load state, and controls the power converter to increase the switching frequency of the driving power. Therefore, in the light-load state, the driving power does not produce a negative current value and provides a stable small current output. In the medium-load or heavy-load state, the switching frequency of the driving power is decreased to reduce a conversion loss, so that the efficiency of the medium-load or heavy-load state is not affected, and it is unnecessary to additionally add an output capacitor to avoid slowing down of a circuit response speed. In this way, the invention is adapted to prevent the light source from flickering under the light-load state.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claim.

What is claimed is:

1. A driving circuit, for driving a light source, comprising:
   a power converter, coupled to the light source, configured to provide a driving power to the light source;
   a detection circuit, configured to provide a feedback signal according to a current value of the light source; and
   a control circuit, coupled to the detection circuit and the power converter, configured to receive an operation command and the feedback signal and determine whether the driving circuit enters a light-load state according to at least one of the operation command and the feedback signal,
   wherein the control circuit is configured to control the power converter to decrease a current value of the driving power in response to the operation command in the light-load state when the driving circuit is determined to enter the light-load state, and the control circuit is configured to control the power converter to increase a switching frequency of the driving power.

2. The driving circuit according to claim 1, further comprising:
   a main controller, coupled to the control circuit, configured to generate the operation command to allow the driving circuit to enter the light-load state.

3. The driving circuit according to claim 2, wherein the control circuit comprises:
   a frequency modulation circuit, coupled to the detection circuit and the main controller, configured to change a charging time in response to at least one of the operation command and the feedback signal; and
   a control chip, coupled to the frequency modulation circuit and the power converter, configured to control the power converter to increase the switching frequency of the driving power according to the charging time,
   wherein in the light-load state, the charging time is shortened, and the switching frequency of the driving power is increased.

4. The driving circuit according to claim 3, wherein the frequency modulation circuit comprises:
   a comparator, configured to compare one of a voltage value of the operation command and a voltage value of the feedback signal with a reference voltage value to generate a frequency modulation signal;
   a transistor, wherein a control terminal of the transistor is coupled to the comparator, a first terminal of the transistor is coupled to the control chip, and the transistor is configured to be turned on or off according to the frequency modulation signal; and
   a capacitor, coupled to the transistor, wherein a first terminal of the capacitor is coupled to a second terminal of the transistor, and a second terminal of the capacitor is coupled to a reference low voltage.

5. The driving circuit according to claim 3, wherein the frequency modulation circuit comprises:
   a comparator, configured to compare one of a voltage value of the operation command and a voltage value of the feedback signal with a reference voltage value to generate a frequency modulation signal;
   a transistor, wherein a control terminal of the transistor is coupled to the comparator, a first terminal of the transistor is coupled to the control chip, and the transistor is configured to be turned on or off according to the frequency modulation signal; and
   a resistor, coupled to the transistor, wherein a first terminal of the resistor is coupled to a second terminal of the transistor, and a second terminal of the resistor is coupled to a reference low voltage.

6. The driving circuit according to claim 1, wherein the detection circuit comprises:
   a sensing resistor, coupled to the light source, configured to convert the current value of the light source into a feedback voltage value; and
   an operational amplifier, configured to gain the feedback voltage value to generate the feedback signal.

7. The driving circuit according to claim 1, wherein the power converter comprises a boost converter.

8. A projection device, comprising:
   a light source, driven to provide a projection light beam;
   an image projection module, configured to use the projection light beam to project a projection image; and
   a driving circuit, configured to drive the light source, comprising:
      a power converter, coupled to the light source, configured to provide a driving power to the light source;
      a detection circuit, configured to provide a feedback signal according to a current value of the light source; and
      a control circuit, coupled to the detection circuit and the power converter, configured to receive an operation command and the feedback signal and determine whether the driving circuit enters a light-load state according to at least one of the operation command and the feedback signal,
      wherein the control circuit is configured to control the power converter to decrease a current value of the driving power in response to the operation command in the light-load state when the driving circuit is determined to enter the light-load state, and the control circuit is configured to control the power converter to increase a switching frequency of the driving power.

* * * * *